United States Patent

[11] 3,617,664

[72] Inventor  Leonard P. Tetrault
              Northport, N.Y.
[21] Appl. No. 24,121
[22] Filed     Mar. 31, 1970
[45] Patented  Nov. 2, 1971
[73] Assignee  Aerodyne Controls Corporation
               Farmingdale, N.Y.

[54] ACCELERATION-RESPONSIVE SWITCH
     8 Claims, 7 Drawing Figs.
[52] U.S. Cl. ................................................ 200/61.51,
                                                     200/61.93
[51] Int. Cl. ................................................. H01h 35/14
[50] Field of Search ....................................... 200/61.45–
                              61.53, 61.93, 52; 340/261, 262, 276

[56]               References Cited
                UNITED STATES PATENTS
1,902,578  3/1933  Parsons ....................  200/61.51
1,915,267  6/1933  Bigelow .....................  200/61.52
2,328,215  8/1943  Jacobs ......................  200/61.51

Primary Examiner—Robert K. Schaefer
Assistant Examiner—M. Ginsburg
Attorney—Edward H. Loveman ABSTRACT: A switch assembly responsive to disturbance and displacement includes a baseplate on which is mounted a cylindrical electrically conductive shell. The shell has a cylindrical cavity with a spherically curved bottom surface on which is a freely moveable electrically conductive ball. The ball is surrounded by a tapered pendulum supported by an electrically conductive disk insulated from the shell. The pendulum is spaced from the ball radially and circumferentially. Electrical terminals are connected in circuit with the pendulum and shell respectively. Any displacement, disturbance, tilt, acceleration or vibration of the assembly beyond a predetermined magnitude causes the ball and pendulum to contact each other and close an external alarm or indicating circuit which may be connected to the electrical terminals.

PATENTED NOV 2 1971
3,617,664
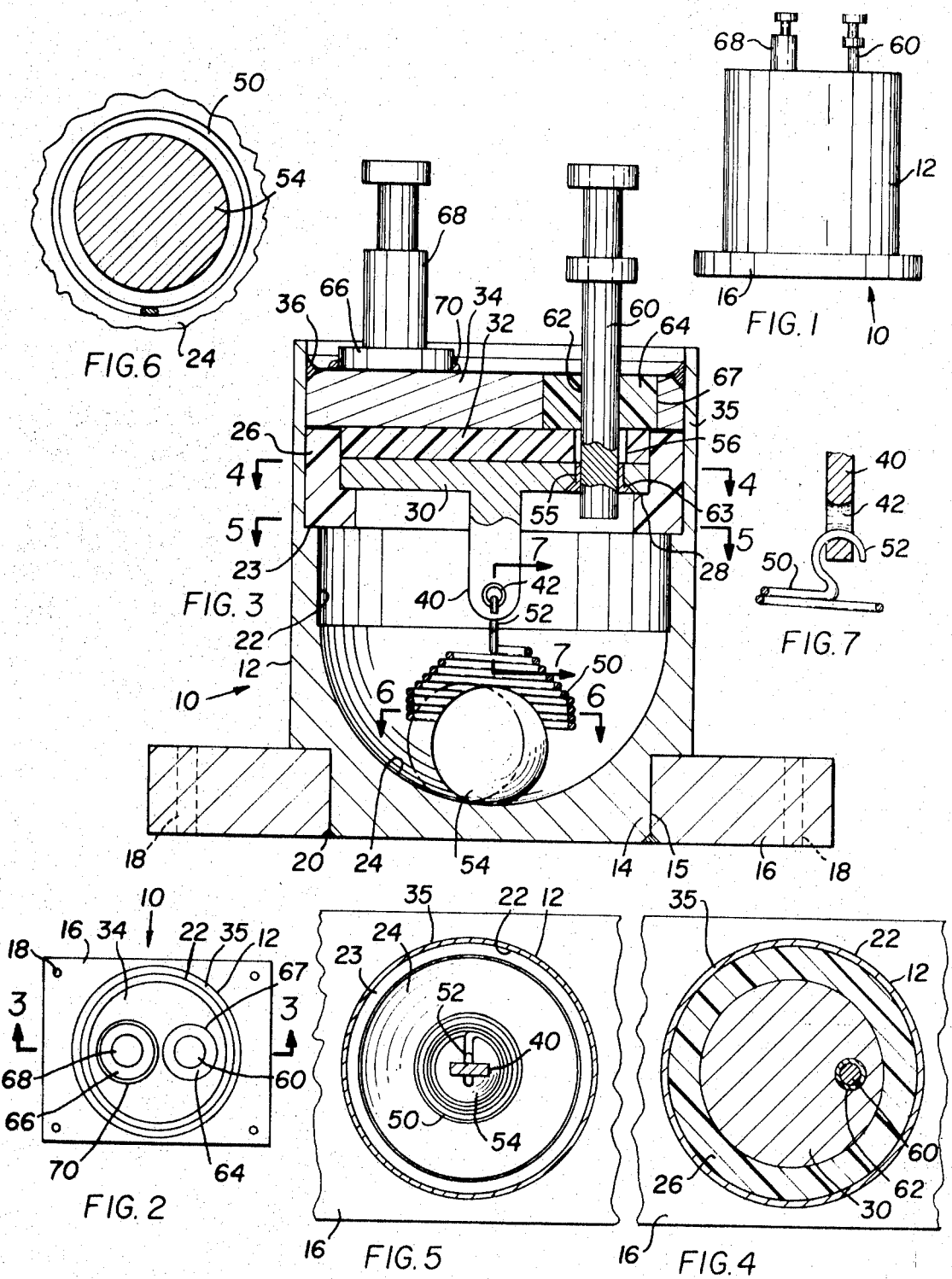
INVENTOR
LEONARD P. TETRAULT
BY Edward H. Loveman
ATTORNEY

ACCELERATION-RESPONSIVE SWITCH

This invention concerns a switch assembly of a highly sensitive type which will respond to tilting, acceleration or vibration to close normally open contacts for actuating an external circuit.

Inertia and acceleration switches heretofore known have generally been responsive to acceleration of a switch above a predetermined magnitude. Gravity-actuated switches heretofore known which are responsive to tilting of the switch have generally been limited to operation in one direction. A need has existed which has not been met by prior switches for a switch assembly which is so highly sensitive that it will respond to displacement in any direction, tilting, vibration or acceleration of very small magnitudes. Such a switch assembly has utility in cooperation with burglar or intrusion alarms and other devices which are required to indicate any disturbance or displacement of a body in which the switch may be mounted. The present invention is directed at meeting this need b providing a small, compact, highly sensitive, relatively simple switch structure.

According to the invention, there is provided an electrically conductive cylindrical shell adapted for mounting on a body to be guarded against disturbance. In the shell is a cylindrical cavity formed with a hemispherical bottom. On the bottom of the shell in the cavity rests a small electrically conductive ball which is normally centered but which is free to roll. Concentrically disposed around the ball is a pendulum which is supported for free lateral movement. The ball and pendulum are closely spaced so that even though the shell may not be normally axially vertical when mounted on a body, the ball and pendulum are always axially aligned when the switch is undisturbed. Any shock, vibration, displacement, tilting or movement of the shell results in movement of the ball and/or the pendulum so that the ball and pendulum contact each other. The shell and pendulum are electrically connected to terminals to which may be connected an external circuit including an alarm, indicator or other electrically responsive device, for indicating that the switch and the body on which it is mounted have been disturbed.

Accordingly, it is a primary object of the present invention to provide for a novel and improved switch assembly which is responsive to the slightest disturbance or displacement.

Another object of the present invention is to provide for a novel switch assembly with a moveable mass adapted to close an electrical circuit when the switch assembly is disturbed or displaced.

A further object of the present invention is to provide a switch assembly including a ball surrounded by a closely spaced pendulum such that any displacement of the switch assembly will cause the ball to contact the pendulum and thereby close the switch.

Yet another object of the present invention is to provide a switch assembly of the type described wherein the ball and pendulum have different, natural resonant frequencies.

These and other objects and many of the attendant advantages of this invention will be readily appreciated as the same becomes better understood by reference to the following detailed description when considered in connection with the accompanying drawings wherein:

FIG. 1 is a side elevational view of a switch assembly embodying the invention;

FIG. 2 is a top view of the switch assembly;

FIG. 3 is an enlarged vertical sectional view taken along line 3—3 of FIG. 2;

FIG. 4 is a cross sectional view taken along line 4—4 of FIG. 3;

FIG. 5 is a cross sectional view taken along line 5—5 of FIG. 3;

FIG. 6 is a fragmentary horizontal sectional view through the pendulum and ball along line 6—6 of FIG. 3; and FIG. 7 is a fragmentary vertical sectional view taken along line 7—7 of FIG. 3.

Referring now to the drawings wherein like reference characters designate like or corresponding parts throughout the several views, there is shown in FIGS. 1 and 3 a switch assembly generally designated by reference numeral 10. The switch assembly 10 comprises a cylindrical shell or housing 12 made of a conductive material such as a metal. The shell has a recessed bottom pedestal 14 which fits into a hole 15 of the flat baseplate 16. Plate 16 has holes 18 at its corners for mounting on or in a body to be monitored by the switch assembly. Shell 12 may be disposed perpendicular to plate 16 or at an angle thereto if desired. The shell 12 may be secured by a suitable cement 20 in hole 15 or if baseplate 16 is made of metal, then the shell 12 may be welded, soldered, or brazed thereto.

Inside shell 12 is a cylindrical cavity 22. The cavity has a spherically curved bottom 24. A step 23 is formed in the cavity to define an annular, circumferential seat for an insulator ring 26. This ring is formed with an inner circumferential seat 28 on which is mounted an electrically conductive metallic disk 30. An insulative disk 32 is seated on the disk 30 and an electrically conductive disk 34 fits snugly above the disk 32 in the cavity 22. Disk 34 has an external diameter substantially equal to the internal diameter of shell wall 35. A filet of solder 36 between the top of disk 34 and wall 35 holds the parts securely in the shell.

Lowermost disk 30 is formed with an integral, depending bracket arm 40. The bracket arm is centrally located and has axially horizontal hole 42 near its bottom end. An electrically conductive pendulum 50 in the form of a tapered coil spring has a hook 52 at its upper end engaged in the hole 42 of the bracket arm 40; see FIGS. 3, 5, and 7. The wider bottom end portion of the pendulum surrounds an electrically conductive metal ball 54 which normally rests at the lowermost center point of spherically curved bottom 24 of the cavity 22. The spacing between the ball and pendulum is very small, so that any tilting, vibration, acceleration or displacement of the assembly will cause a rolling movement of the ball, a swinging movement of the pendulum or both to cause at least a momentary contact between the ball and pendulum.

Disk 30 is further formed with a hole 55 registering with a hole 56 in insulating disk 32. A cylindrical electrical terminal post 60 is secured by solder 63 in hole 55 of disk 30. The terminal post 60 extends axially upward through hole 56 in disk 32 and through a hole 62 in an insulative ring 64 which is seated in a hole 67 in conductive disk 34. Base 66 of another cylindrical electrical terminal post 68 is secured by solder or welding 70 to the top of disk 34 at a position spaced laterally from post 60.

It will be apparent from an inspection of the drawing and particularly FIG. 3 that any relative displacement of the ball and pendulum resulting in their momentary contact will close an electrical circuit path between the terminal posts 60 and 68 via disk 30, pendulum 50, ball 54, shell 12 and disk 34. If an electrical alarm or indicating circuit is connected to posts 60, 68, a suitable alarm or indication will be provided that the switch assembly 10 and the body on which it may be mounted have been disturbed or displaced.

It is preferable that the ball and pendulum have different natural mechanical resonant frequencies which will insure relative movement between the ball and the pendulum when subjected to any frequency of vibration. The amplitudes of vibration of the ball and pendulum will, of course, depend on their masses, dimensions, diameter of the rolling surface, materials, etc.

If desired, the shell 12 can be made of insulative material, but the wall of cavity 22 must then be metal plated to impart electrical conductivity. Terminal post 60 may, of course, be integrally formed with disk 30 instead of being a separate unit secured by soldering or welding to the disk. Similarly, post 68 and disk 34 may be an integrally formed unit. In addition, a frustoconical metallic shell may be substituted for the tapered coil spring to serve as a pendulum. Furthermore, the bottom 24 of the cavity 22 may be shaped conically rather than spherically as illustrated. Moreover, many other modifications may be devised by those skilled in the art in order to meet different user requirements.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A switch assembly for activating an electrical circuit in response to a displacement or disturbance comprising:
    a shell which is electrically conductive at least in part and which is closed at its bottom end, said shell having a cavity formed therein with a curved, closed bottom surface and having its lowest point at the center of said surface;
    a spherical, electrically conductive ball disposed in said cavity and normally resting at the lowest point of said curved surface, said ball being free rolling on said surface in response to any disturbance of said shell;
    an electrically conductive terminal means out of contact with said shell and extending outwardly of said shell,
    means for connecting said shell and said terminal means to said electrical circuit; and
    an electrically conductive, free-swinging hollow pendulum supported by said electrically conductive terminal means, said pendulum surrounding said ball and normally spaced radially therefrom, whereby occurrence of said disturbance causes relative movement between said ball and said pendulum, thereby causing them to contact each other and actuate said electrical circuit.

2. A switch assembly as defined in claim 1, wherein said means for connecting said shell to said external circuit comprises another electrically conductive terminal electrically connected in circuit with said shell.

3. A switch assembly as defined in claim 1 wherein said ball and said curved surface have a natural frequency of vibration which is different from the natural frequency of vibration of said pendulum.

4. A switch assembly as defined in claim 1, wherein said pendulum is a tapered coiled metal spring.

5. A switch assembly as defined in claim 1, wherein an insulative ring is secured in said cavity in axial alignment with said shell and having an aperture therethrough and said electrically conductive terminal means comprises:
    a first disk having an aperture therein supported by said ring and having an integral depending axial bracket arm supporting said pendulum;
    an insulative apertured second disk covering said first disk, and
    a terminal post fixed to said first disk and extending through said aperture in said first disk and through said aperture in said insulative ring.

6. A switch assembly as defined in claim 5, wherein said means for connecting said shell to said external circuit, comprises:
    an electrically conductive third disk disposed over said second disk in said cavity and which contacts said shell; and,
    an electrically conductive terminal mounted on said third disk.

7. A switch assembly as defined in claim 6 wherein said pendulum is a tapered coiled metallic spring having a hook at its upper end engaged by said bracket arm, and said assembly further comprising a flat baseplate, said shell being secured to said base plate, so hat displacement, vibration or disturbance of said base plate causes relative displacement and contact between said ball and said pendulum.

8. A switch assembly as defined in claim 7 wherein said ball has a natural frequency of vibration which is different from the natural frequency of vibration of said pendulum.

* * * * *